(12) United States Patent  (10) Patent No.: US 8,814,209 B1
Way  (45) Date of Patent: Aug. 26, 2014

(54) HITCH APPARATUS AND METHOD

(76) Inventor: Maxwell E. Way, Burlington, NC (US)

(*) Notice: Subject to any disclaimer, the term of this patent is extended or adjusted under 35 U.S.C. 154(b) by 158 days.

(21) Appl. No.: 13/369,472

(22) Filed: Feb. 9, 2012

(51) Int. Cl.
*B60R 9/06* (2006.01)
*B60R 11/06* (2006.01)

(52) U.S. Cl.
USPC ........... 280/769; 224/519; 224/522; 224/524; 224/533; 224/536

(58) Field of Classification Search
CPC .............. B60D 1/06; B60D 1/07; B60D 1/52; B60R 9/06; B60R 9/10; B60R 11/06; B62D 43/02
USPC ......... 224/510, 519, 520, 521, 522, 523, 524, 224/525, 526, 533, 536, 537; 280/415.1, 280/416.1, 491.1, 491.2, 762, 769
See application file for complete search history.

(56) References Cited

U.S. PATENT DOCUMENTS

| | | | |
|---|---|---|---|
| 4,640,658 A * | 2/1987 | Webb, Jr. | 414/462 |
| 4,705,254 A * | 11/1987 | Swanson | 248/288.11 |
| 4,949,945 A * | 8/1990 | Whiteley | 269/71 |
| 5,082,037 A * | 1/1992 | Hammons et al. | 144/286.5 |
| 5,267,748 A | 12/1993 | Curran | 280/415.1 |
| 5,433,356 A * | 7/1995 | Russell | 224/519 |
| 5,890,739 A * | 4/1999 | Cogswell, Sr. | 280/769 |
| 6,109,855 A * | 8/2000 | Vela-Cuellar | 414/462 |
| 6,224,127 B1 * | 5/2001 | Hodge | 296/26.08 |
| 6,227,517 B1 * | 5/2001 | Wohl | 248/694 |
| D468,681 S * | 1/2003 | Rath | D12/400 |
| 6,511,088 B2 * | 1/2003 | Kahlstorf | 280/415.1 |
| 6,637,738 B1 * | 10/2003 | Beaudet | 269/271 |
| 6,824,183 B1 * | 11/2004 | Hodge | 296/26.11 |
| 7,066,365 B2 * | 6/2006 | Brown | 224/401 |
| 7,090,104 B2 * | 8/2006 | Dorety | 224/524 |
| 7,195,262 B2 * | 3/2007 | Chaudoin et al. | 280/166 |
| 7,240,707 B1 * | 7/2007 | Schweitzer et al. | 144/286.5 |
| 8,166,695 B2 * | 5/2012 | Pippin | 42/94 |
| 2001/0042985 A1 * | 11/2001 | Hodge | 296/26.08 |
| 2007/0290480 A1 * | 12/2007 | Wolter | 280/415.1 |
| 2008/0061097 A1 * | 3/2008 | Milender et al. | 224/519 |
| 2008/0231029 A1 * | 9/2008 | Hummel | 280/769 |
| 2010/0019122 A1 * | 1/2010 | Barrett et al. | 248/689 |
| 2010/0072240 A1 * | 3/2010 | Cornes | 224/536 |
| 2013/0127104 A1 * | 5/2013 | Onello et al. | 269/99 |

* cited by examiner

Primary Examiner — Joseph M Rocca
Assistant Examiner — Marc A Scharich
(74) Attorney, Agent, or Firm — Blake P. Hurt

(57) ABSTRACT

Hitch apparatus and a method of using the same with a vehicle hitch allows the use of a vise, anvil, grinder or other tool requiring mounting before use. Various apertures on the hitch apparatus allow for selected vertical or horizontal mounting on a vehicle hitch. The hitch apparatus further includes a leg to provide for additional strength and structural support.

14 Claims, 6 Drawing Sheets

HITCH APPARATUS AND METHOD

FIELD OF THE INVENTION

The invention herein pertains to an apparatus for attaching to the hitch of a vehicle and particularly pertains to an apparatus for supporting a tool such as a vise.

DESCRIPTION OF THE PRIOR ART AND OBJECTIVES OF THE INVENTION

Plumbers, mechanics and other workman commonly drive their vehicles to work sites and use tools contained therein for various jobs. Vises, anvils, and other like tools generally must be mounted before they can be employed. It has been found that by mounting a vise or the like on the back of pickup truck, the vise is both convenient to use and stable during use. U.S. Pat. No. 5,267,748 ('748) demonstrates such a device and its attachment to a pickup truck hitch.

Certain prior art devices are limited in their use for example the device shown in the current '748 patent can easily be used to hold a workpiece in a substantially horizontal position but difficulty is encountered when the need arises for holding a vertical work piece such as a pipe or the like. Also, prior art support devices may break or crack when extreme vertical force is applied such as would occur when hammering on a mounted anvil or work piece in a vise or when extreme weight is applied to the work platform while holding a vise or anvil.

Thus, in view of the problems and disadvantages associated with prior art devices, the present invention was conceived and one of its objectives is to provide a hitch apparatus which will support a vise or other tool held in either a vertical or horizontal position.

It is another objective of the present invention to provide a hitch apparatus which includes a series of apertures for selected manual adjustment during attachment to a hitch of any of a variety of vehicles such as trucks or vans.

It is still another objective of the present invention to provide a hitch apparatus which is easy to assemble, attach and use.

It is yet another objective of the present invention to provide a hitch apparatus which can be easily used with a lowered pickup truck tailgate and which will not interfere with the lowering or raising of the tailgate while in use.

It is a further objective of the present invention to provide a hitch apparatus and method of use to provide a sturdy work platform proximate the rear of a vehicle for use in either a vertical or horizontal posture.

It is yet a further objective of the present invention to provide a hitch apparatus which includes a releasable adjustable leg for attachment to the apparatus when mounted in either a vertical or horizontal position which will contact the ground or other substrate to provide additional support to the work platform.

It is still a further objective of the present invention to provide an easily adjustable and removable hitch apparatus for secure attachment to a vehicle hitch having a work platform for a variety of mountable tools.

Various other objectives and advantages of the present invention will become apparent to those skilled in the art as a more detailed description is set forth below.

SUMMARY OF THE INVENTION

The aforesaid and other objectives are realized by providing a hitch apparatus which is formed from tubular steel and includes a vertical lateral member with a work platform centered thereon and a horizontal longitudinal member for attachment to a hitch on a vehicle such as a pickup truck. The longitudinal member extends outwardly a sufficient length to prevent interference with the work platform when opening or closing a pickup truck tailgate and includes a series of apertures for adjustable attachment to the vehicle hitch. The work platform includes a series of threaded openings for mounting a vise, grinder, drill press, anvil or other tools thereon. A brace angularly extends from the lateral member proximate the work platform to the longitudinal member to provide additional strength and structural support to the hitch apparatus. A removable leg having a series of opposing apertures can be affixed to provide additional strength to the hitch apparatus when required. A tubular leg coupler is joined to both the longitudinal member and the lateral member such as by welding for insertion and attachment of the leg when the hitch apparatus is positioned horizontally. A locking pin is used for securing and release of the hitch apparatus to the vehicle hitch and another locking pin is utilized for attachment, release and adjusting of the leg as required.

The method of use includes the steps of providing a work platform affixed to a hitch apparatus which can be readily joined to or removed from a vehicle and which can be positioned either vertically or horizontally as required for the particular work piece encountered.

DETAILED DESCRIPTION OF THE PREFERRED EMBODIMENT AND OPERATION OF THE INVENTION

Figure 1:
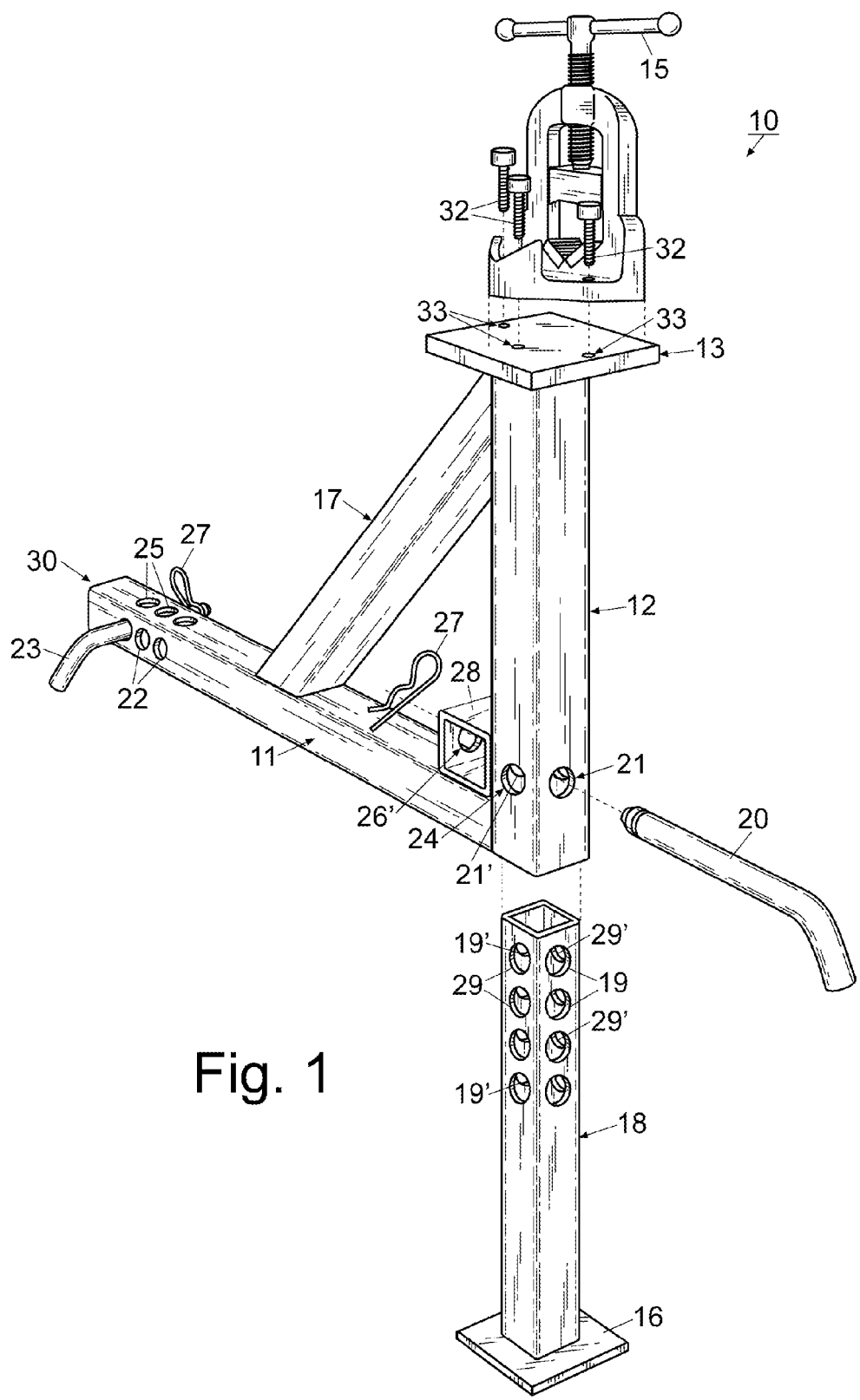
FIG. 1 shows a perspective, exploded view of a hitch apparatus with a leg and a vise.

For a better understanding of the invention and its operation, turning now to the drawings, FIG. 1 illustrates preferred hitch apparatus 10 formed from tubular steel and is shown in a perspective exploded view with leg 18 and vise 15. Hitch apparatus 10 as seen in FIGS. 2, 3, 4, 5, 6 and 7 includes longitudinal member 11, lateral member 12, brace 17, leg coupler 28 and work platform 13 seen in a vertical or upright position in FIG. 1. Work platform 13 is planar (FIG. 6), preferably made from steel and is suitable for mounting vise 15 thereon. Also other tools (not shown) could be affixed to work platform 13 such as anvils, saws, grinders or the like.

Work platform 13 includes a series of threaded openings 33 for such tool attachment and is rigidly welded to the top of lateral member 12.

Figure 2:
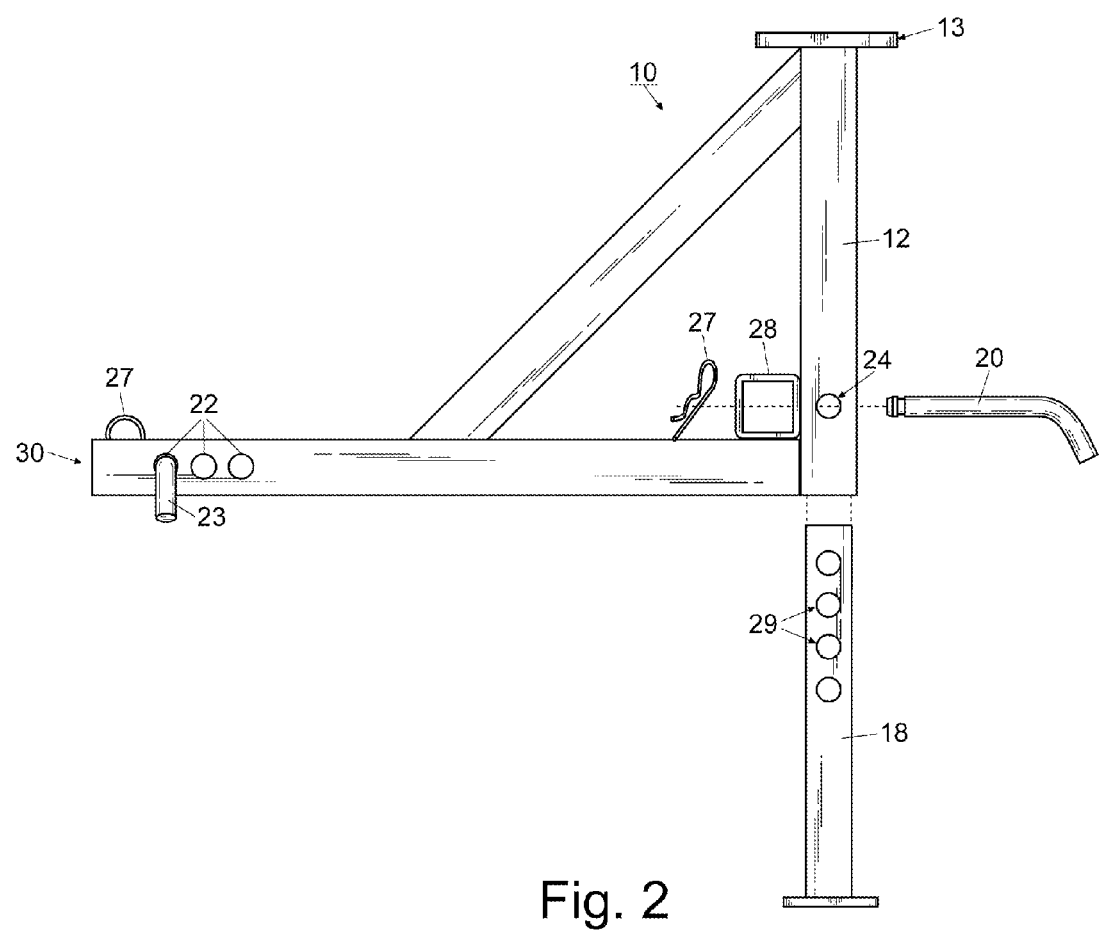
FIG. 2 pictures a left side elevational view of the hitch apparatus as seen in FIG. 1 without the vise.
Figure 3:
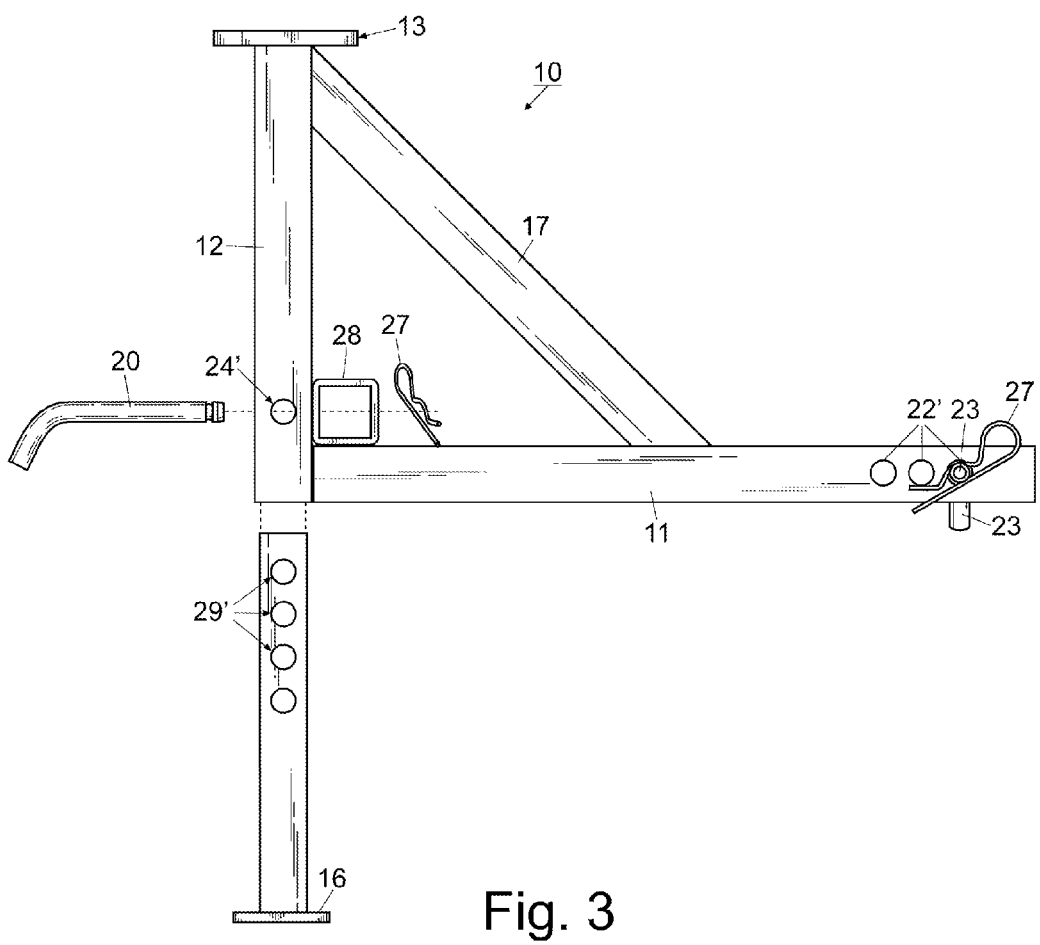
FIG. 3 depicts a right side elevational view of the hitch apparatus as seen in FIG. 2.

Lateral member 12 is rigidly affixed at a ninety degree) (90° angle to longitudinal member 11 such as by welding or other conventional means and includes leg coupler 28 rigidly affixed thereto. Lateral member 12 includes opposing apertures 21, 21' on the front and rear thereof (FIG. 1) and opposing apertures 24, 24' on the sides as seen in FIGS. 2 and 3. Leg coupler 28 as seen in FIGS. 1, 2 and 3 is attached proximate the integral joint of lateral member 12 and longitudinal member 11 and as would be understood, includes opposing apertures 26, 26' (26 not shown) which are in alignment with apertures 21, 21' of lateral member 12 for receiving locking pin 20 therethrough. Pin clip 27 is utilized with locking pin 20 once positioned to prevent inadvertent removal.

Figure 4:
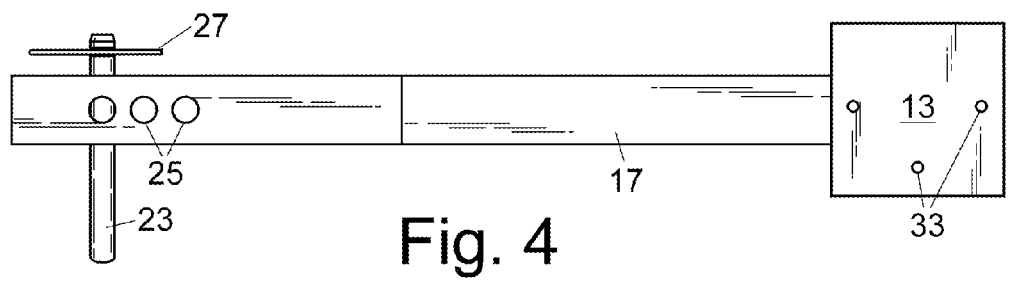
FIG. 4 demonstrates a top plan view of the hitch apparatus as seen in FIG. 2 without the leg.
Figure 5:
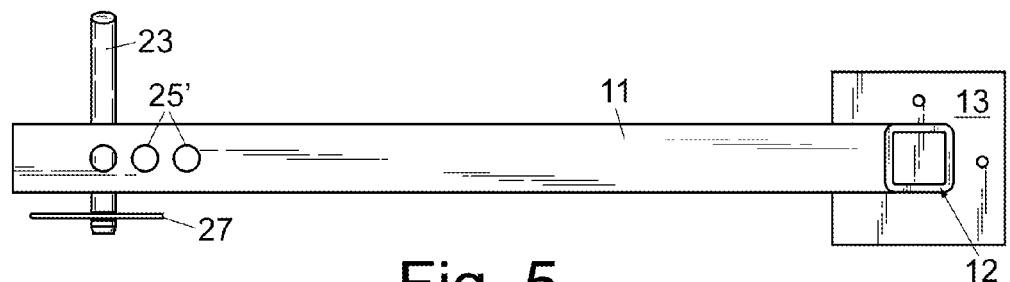
FIG. 5 illustrates a bottom plan view of the hitch apparatus as seen in FIG. 4.
Figure 8:
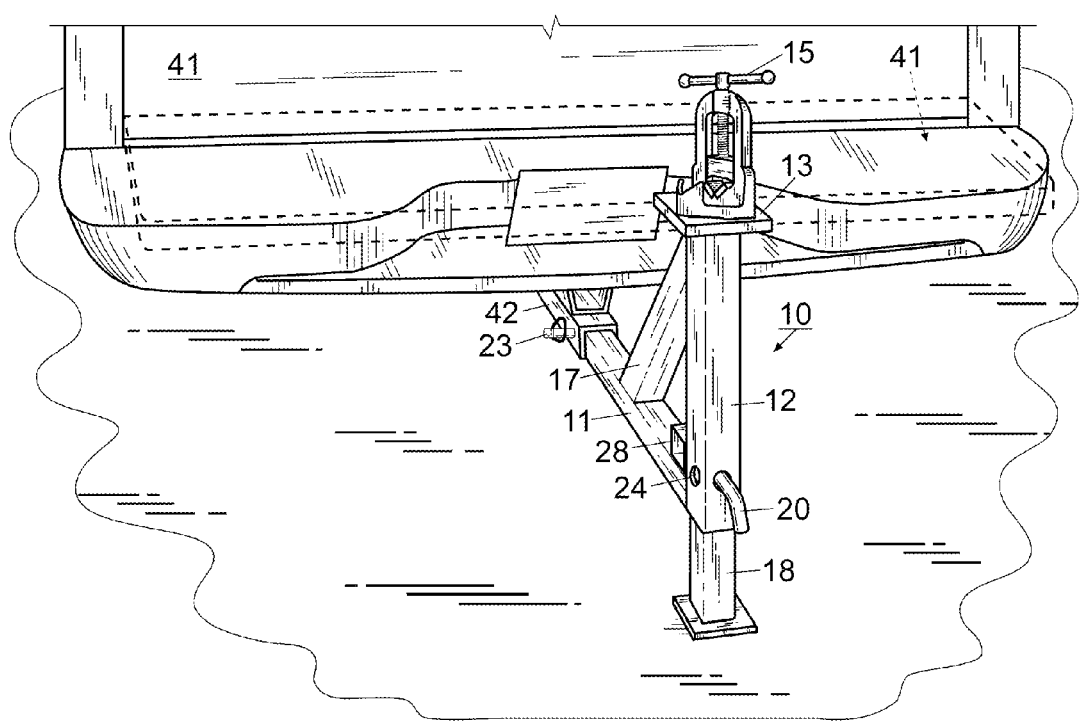
FIG. 8 schematically illustrates the hitch apparatus of FIG. 1 with the leg and vise attached and affixed to a truck hitch in a vertical posture.
Figure 9:
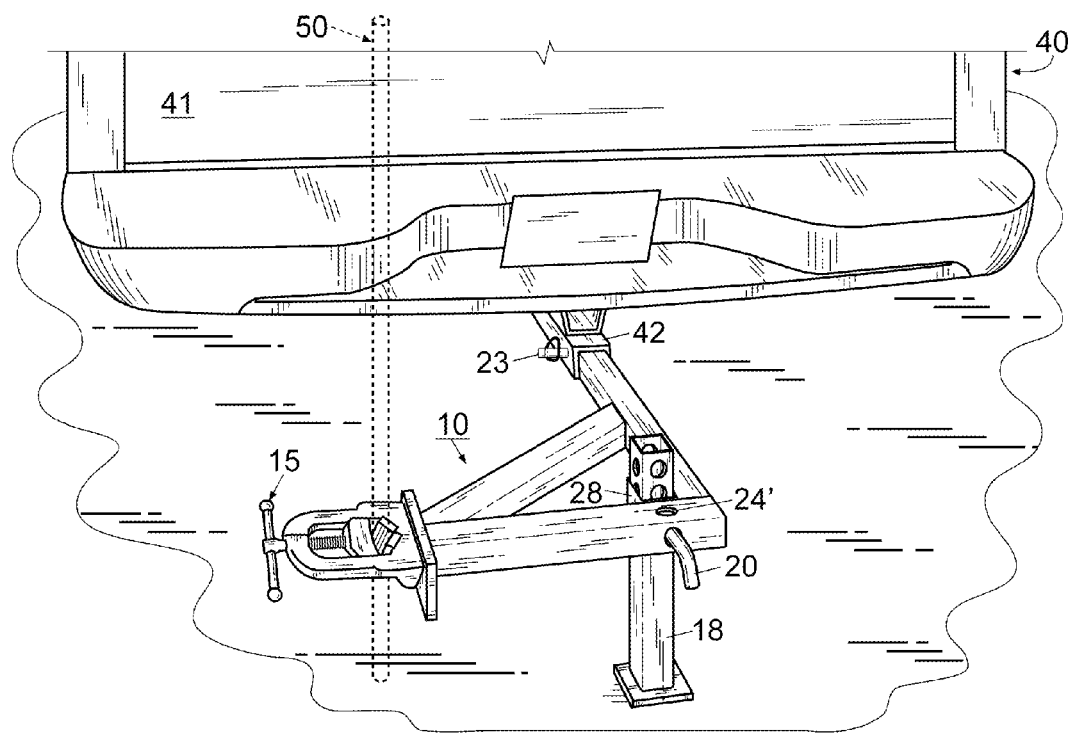
FIG. 9 depicts schematically the hitch apparatus of FIG. 8 as rotated and affixed to the truck hitch in a horizontal posture with a pipe in dotted line fashion held in the vise.

Longitudinal member 11 includes a series of opposing apertures 22, 22' on the sides thereof as seen in FIGS. 2 and 3 and opposing apertures 25, 25' on the top and bottom as seen in FIGS. 4 and 5. Apertures 22, 22', 25 and 25' are for selectively attaching terminal end 30 (FIG. 1) of longitudinal member 11 to hitch 42 of pickup truck 40 in respectively, either a vertical or horizontal position as shown in FIGS. 8 and 9. Locking pin 23 and pin clip 27 are utilized for locking longitudinal member 11 of hitch apparatus 10 in place, thus preventing unwanted movement. As would be understood a series of apertures 22, 22', 25 and 25' are provided for use with hitches of various pickup trucks or other vehicles in order to make several positions available to avoid the bumper or other extended features such as an open tailgate which otherwise may hinder positioning and attachment of hitch apparatus 10. Brace 17 is angularly, rigidly affixed to longitudinal member 11 and lateral member 12 proximate work platform 13 such as by welding or other conventional means for added durability. Brace 17 also increases the stability of work platform 13 when in use. Lateral member 12, longitudinal member 11, brace 17 and leg coupler 28 are all formed from tubular steel for strength and durability.

Leg 18 as seen in FIGS. 1, 2, 3, 8 and 9 is also formed from tubular steel and includes a series of opposing apertures 19, 19' on the front and rear thereof (FIG. 1) and opposing apertures 29, 29' on the sides thereof (FIGS. 2 and 3) for versatile selective attachment to either lateral member 12 (FIG. 8) or leg coupler 28 (FIG. 9). Leg 18 is adjustably positioned within hitch apparatus 10 and provides additional structural support to work platform 13 when in use. As would be understood a series of opposing apertures 19, 19', 29 and 29' are provided for adjustably selectively positioning leg 18 within hitch apparatus 10 depending on the height of the particular pickup truck hitch and the substrate therebeneath. Leg 18 includes planar rectangular foot 16 for increased stability of hitch apparatus 10 when positioned on the ground or other surface. Once leg 18 is positioned within lateral member 12 as seen in FIG. 8 locking pin 20 is passed through aperture 21, one of selected opposing aperture pairs 19, 19', opposing aperture 21' and opposing apertures 26, 26' of leg coupler 28 whereby pin clip 27 can be affixed thereto to secure leg 18 with hitch apparatus 10 and prevent unwanted movement or slippage. Should the user (not shown) find locking pin 20 inconvenient as positioned while working with vise 15, pin clip 27 can be dislodged and locking pin 20 can be removed and repositioned through side aperture 24 of lateral member 12, a selected pair of opposing apertures 29, 29' of leg 18 and opposing side aperture 24'. Pin clip 27 can be thereafter again engaged for security purposes.

Figure 6:
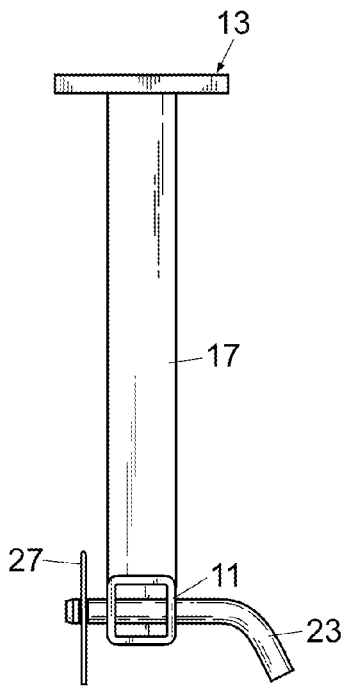
FIG. 6 features a rear elevational view of the hitch apparatus as seen in FIG. 4.
Figure 7:
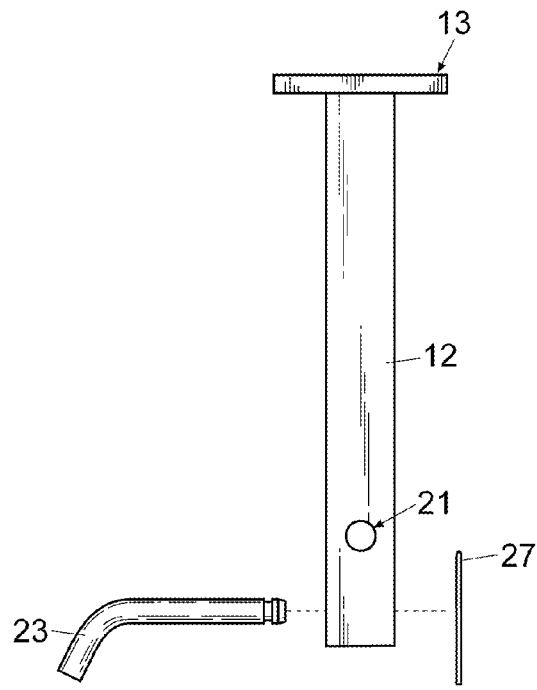
FIG. 7 shows a front elevational view of the hitch apparatus as seen in FIG. 4 with the locking pin and pin clip exploded therefrom.

When hitch apparatus 10 is mounted vertically as shown schematically in FIG. 8 hitch locking pin 23 passes through an aperture (not shown) in hitch 42, one of selected opposing aperture pairs 22, 22' and the opposing hitch aperture (not shown) to adjustably engage hitch apparatus 10 with truck hitch 42 beneath pickup truck 40. Hitch locking pin 23 is held in place by pin clip 27 as seen in FIGS. 4, 5 and 6. As also seen in FIG. 8 tailgate 41 is shown in dotted line fashion in a position substantially parallel with the upper surface of work support 13 to provide an additional work surface for retaining a pipe or other member held in vise 15 while in a horizontal position. Leg 18 is affixed to hitch apparatus 10 whereby locking pin 20 simultaneously passes through apertures 21, 21' of lateral member 12, a selected pair of apertures 19, 19' of leg 18 and apertures 26, 26' of leg coupler 28 as shown in FIG. 1 and is maintained in place by pin clip 27.

Preferred hitch apparatus 10 can be attached to hitch 42 in a horizontal position as shown in FIG. 9 by rotating hitch apparatus 10 either clockwise or counterclockwise ninety degrees (90°). When hitch apparatus 10 is placed in a horizontal posture as shown in FIG. 9, leg 18 is positioned into leg coupler 28 prior to engagement of longitudinal member 11 within hitch 42. Once longitudinal member 11 is positioned within hitch 42, hitch locking pin 23 is positioned within an aperture (not shown) of hitch 42, through a selected pair of opposing apertures 25, 25' and through the opposing hitch aperture (not shown) whereby pin clip 27 is then attached to prevent inadvertent slippage. Leg 18 is then adjusted as needed within leg coupler 28 and locking pin 20 is passed through apertures 21, 21' of lateral member 12, a selected pair of apertures 19, 19' of leg 18 and apertures 26, 26' of leg coupler 28 which is then maintained in place by pin clip 27.

In the preferred method of use, hitch apparatus 10 is affixed to truck hitch 42 by inserting terminal end 30 of longitudinal member 11 therein for either a vertical or horizontal assembly. For vertical assembly as seen in FIG. 8 hitch locking pin 23 is inserted through a selected pair of opposing apertures 22, 22' of longitudinal member 11 as earlier described and pin clip 27 is then positioned such as shown in FIGS. 4 and 5. Next, leg 18 is adjustably positioned in lateral member 12 and locking pin 20 is inserted through aperture 21 of lateral member 12, a selected pair of opposing apertures 19, 19' of leg 18, opposing aperture 21' of lateral member 12 and through opposing apertures 26, 26' of leg coupler 28 and is secured by pin clip 27 as seen in FIG. 1. Next, vise 15 is affixed to work platform 13 by machine bolts 32 which enter threaded openings 33 on work support 13. As would be understood other mountable machine tools (not shown) could be employed as earlier mentioned such as anvils, grinders, saws or the like. Once vise 15 is so attached, the desired work can be performed. Tailgate 41 can be lowered as seen in dotted line fashion as needed to provide an additional work surface for holding work materials or other tools (not shown) without interference from work platform 13.

Should it be necessary to retain pipe 50 shown in dotted line fashion or other member in a vertical position as seen in FIG. 9, hitch locking pin 23 can be removed by disengaging pin clip 27 and hitch apparatus 10 removed from truck hitch 42. Leg 18 is likewise removed from lateral member 12 by extracting pin clip 27 and locking pin 20. Hitch apparatus 10 is then rotated either in a clockwise or counterclockwise direction ninety degrees (90°) and reengaged with hitch 42. Leg 18 is inserted through leg coupler 28 before locking engagement of longitudinal member 11 with hitch 42. Hitch locking pin 23 is then inserted into an aperture (not shown) of hitch 42 and selectively through one of the several pairs of opposing apertures 25, 25' and the opposing hitch 42 aperture (not shown) and pin clip 27 is then reattached. Leg 18 can then be adjusted as needed and locking pin 20 inserted as previously described and locked in place with pin clip 27. Vise 15 when affixed atop work platform 13 is then ready for use.

After use hitch apparatus 10 can be removed from hitch 42 by removal of locking pin 23 and leg 18 removed from hitch apparatus 10 by disengaging locking pin 20. Hitch apparatus 10 is then available for storage and transportation as needed.

The illustrations and examples provided herein are for explanatory purposes and are not intended to limit the scope of the appended claims.

I claim:

1. A hitch apparatus for attachment to a vehicle, said hitch apparatus comprising: a work platform configured to support a holding tool thereon; a platform support attached to said work platform, said platform support comprising a longitudinal member, a lateral member, said lateral member attached to said longitudinal member, a leg coupler, said leg coupler attached to said lateral member and said work platform attached to said lateral member; and a leg, wherein during a first hitch configuration in which said hitch apparatus is attached to said vehicle such that said lateral member extends substantially vertically, said leg is releasably affixed to said lateral member in opposing relation to said work platform and prevents displacement of said work platform by said leg abutting a ground surface beneath said hitch apparatus, and wherein during a second hitch configuration in which said hitch apparatus is attached to said vehicle such that said lateral member extends substantially horizontally, said leg is releasably affixed to said leg coupler and prevents displacement of said work platform by said leg abutting said ground surface beneath said hitch apparatus.

2. The hitch apparatus of claim 1 further comprising a holding tool, said holding tool mounted on said work platform.

3. The hitch apparatus of claim 2 wherein said holding tool comprises a vise.

4. The hitch apparatus of claim 1 further comprising a hitch pin, said longitudinal member defining an aperture, said hitch pin positioned in said aperture.

5. The hitch apparatus of claim 1 wherein said platform support further comprises a brace, said brace attached to said longitudinal member and to said lateral member.

6. The hitch apparatus of claim 5 wherein said brace, said longitudinal member and said lateral member are each formed from tubular steel.

7. The hitch apparatus of claim 1 wherein said lateral member defines a first pair of apertures and a second pair of apertures, said first and second pair of apertures formed in said lateral member, and wherein said first pair of apertures are normal to said second pair of apertures.

8. The hitch apparatus of claim 1 wherein said longitudinal member is sized to fit within a tubular hitch mounted on the vehicle.

9. The hitch apparatus of claim 1 further comprising a locking pin, said leg and said lateral member each defining apertures, said locking pin positioned in said leg apertures and said lateral member apertures.

10. A hitch apparatus for attachment to a vehicle, said hitch apparatus comprising: a longitudinal member perpendicularly affixed to a lateral member, said lateral member supporting a planar work platform defining a plurality of threaded openings each sized to receive a threaded bolt for securing a holding tool to said work platform; a brace angularly attached to the lateral member and to the longitudinal member; a leg defining first and second pairs of opposing apertures; a tubular leg coupler sized to receive the leg, the tubular leg coupler defining a pair of opposing apertures and attached to said hitch apparatus so as to abut said longitudinal and lateral members, wherein the longitudinal member is sized to fit within a tubular hitch mounted on the vehicle; and wherein during a first hitch configuration in which said hitch apparatus is attached to said vehicle such that said lateral member extends substantially vertically, said leg is releasably affixed to said lateral member in opposing relation to said work platform and prevents displacement of said work platform by said leg abutting a ground surface beneath said hitch apparatus, and wherein during a second hitch configuration in which said hitch apparatus is attached to said vehicle such that said lateral member extends substantially horizontally, said leg is releasably affixed to said tubular leg coupler and prevents displacement of said work platform by said leg abutting said ground surface beneath said hitch apparatus.

11. The hitch apparatus of claim 10 wherein the holding tool comprises a vise.

12. The hitch apparatus of claim 10 further comprising a hitch pin, the longitudinal member defining an aperture, the hitch pin positioned in the aperture.

13. The hitch apparatus of claim 10 wherein the brace, the longitudinal member and the lateral member are each formed from tubular steel.

14. The hitch apparatus of claim 10 wherein said lateral member defines a first pair of apertures and a second pair of apertures formed in said lateral member, and wherein said first pair of apertures are normal to said second pair of apertures.

* * * * *